United States Patent [19]

Brodie, III et al.

[11] Patent Number: 5,284,892
[45] Date of Patent: Feb. 8, 1994

[54] ALDEHYDE SCAVENGING COMPOSITIONS AND METHODS RELATING THERETO

[75] Inventors: Vincent Brodie, III, Wilmington, Del.; Donna L. Visioli, Lower Gwynedd, Pa.

[73] Assignee: E. I. Du Pont de Nemours and Company, Wilmington, Del.

[21] Appl. No.: 974,042

[22] Filed: Nov. 10, 1992

[51] Int. Cl.$^5$ .............................................. C08K 5/17
[52] U.S. Cl. .................................. 524/251; 524/252; 525/197; 525/198; 525/217
[58] Field of Search ................ 524/251, 252; 525/197, 525/198, 217

[56] References Cited

U.S. PATENT DOCUMENTS 3,676,394  7/1972  Murray et al. ...................... 524/252

Primary Examiner—Kriellion S. Morgan
Attorney, Agent, or Firm—Konrad S. Kaeding

[57] ABSTRACT

The present invention relates generally to compositions of polyalkylene imine ("PAI"), particularly polyethylene imine ("PEI") and polyolefin polymer (including copolymers and derivatives thereof); such compositions can be used in producing packaging films for oil containing foods, whereby the film is capable of scavenging unwanted aldehydes from the food product. The preferred compositions comprise a PAI substantially discontinuous phase and a olefinic polymer (including copolymers or derivatives thereof) substantially continuous phase in a weight ratio of PAI to olefinic polymer of about 0.001-30:100 which optionally also includes a binding agent.

11 Claims, No Drawings

ALDEHYDE SCAVENGING COMPOSITIONS AND METHODS RELATING THERETO

FIELD OF THE INVENTION

The present invention relates generally to compositions of polyalkylene imine ("PAI"), particularly polyethylene imine ("PEI") and polyolefin polymer (including copolymers and derivatives thereof); such compositions can be used in producing packaging films for oil containing foods, whereby the film is capable of scavenging unwanted aldehydes from the food product. More specifically, the preferred compositions of the present invention comprise a PAI substantially discontinuous phase and a olefinic polymer (including copolymers or derivatives thereof) substantially continuous phase in a weight ratio of PAI to olefinic polymer of about 0.001–30:100 which optionally also includes a binding agent.

BACKGROUND OF THE INVENTION

A co-inventor of the present invention is also a co-inventor to "Novel Packaging Compositions That Extend The Shelf Life Of Oil-Containing Foods", U.S. Ser. No. 07/724,421, filed Jul. 3, 1991, in which PEI is disclosed to have aldehyde scavenging capabilities (which can extend shelf life of oil-containing foods) when used as part of a packaging material. The present invention is an important improvement to U.S. Ser. No. 724,421.

U.S. Ser. No. 724,421 teaches the application of a thin coating of PEI as part of a multilayer composite film. However, the application of a thin coating of a material adds to the overall manufacturing complexity and creates an additional layer to be accomodated in a multilayer packaging structure.

PEI is a highly viscous liquid and is generally considered not to be pumpable. Furthermore, liquids generally do not pre-compound well with polymeric materials which are solid at room temperature, because the liquid will generally tend to bloom to the surface or otherwise migrate within the solid polymeric material; surface migration of PEI would generally cause the pre-compounded granules to stick to one another and inhibit flow into an extruder or the like.

The present invention overcomes or dramatically decreases the above described problems.

SUMMARY OF THE INVENTION

The present invention is directed to a novel composition of polyalkylene imine ("PAI"), most preferably polyethylene imine ("PEI"), and olefinic polymer. As used herein, olefinic polymer is intended to also include copolymers or derivatives thereof. Hence, the olefinic polymer of the present invention can be a very wide variety of polymeric materials, such as ethylene vinyl acetate, polypropylene, polyethylene, ethylene vinyl ester copolymers (or acieds thereof), and the like.

An important property of the olefinic polymer is that it should have properties sufficient to allow the polymer to be made into a thin film or sheet and used in a packaging application. In an alternative embodiment, the olefinic polymer is chosen which is capable of heat sealing to itself in a packaging application.

The combination can be incorporated into a film and placed in direct or indirect contact with a food product. The film will scavenge unwanted aldehydes from the food product but will generally not allow PAI migration from the film.

"Binding Agents" can be added to the compositions of the present invention to further "lock in" the PAI to the polymer matrix. Useful binding agents are functionalized polymers, particularly polymers functionalized with carboxyl functionality, most particularly anhydride functionality.

Other optional additives include plasticizers, tackifiers, processing aids, pigments and the like, including any conventionally known additive for the production of films for packaging applications.

The PAI and olefinic polymer are preferably blended in a weight ratio of about 0.001–30:100 at temperatures between about 85° C. and about 300° C., more preferably between about 100° C. and 225° C. The method of producing the blend is not material, as long as a relatively uniform distribution of the PAI polymer through the olefinic polymer is obtained. It is preferred for the blend to have intimate mixing of the polymers, i.e. microscopic distribution of PAI through the olefinic polymer, whereby the size of the dispersed phase is no more than 10 microns, preferably about 1 micron or less.

Alternative methods for preparing a blend can be used within the scope of this invention. For example, a masterbatch method can be used to form the unique blend.

DETAILED DESCRIPTION OF THE PREFERRED EMBODIMENT

Introduction

The present invention is directed to a novel composition of polyalkylene imine ("PAI"), most preferably polyethylene imine ("PEI") and olefinic polymer which can be made into a film and used in a structure containing a funcitonal barrier between this novel composition and a food product, or in an alternative embodiment, used as the food contact layer. The film will scavenge unwanted aldehydes from the food product but will generally not allow PEI migration from the film. In the alternative embodiment, "binding agents" are added to the compositions of the present invention which even more securely bind the PEI into the polymer matrix.

Each component (and optional additives) of the present invention will be discussed separately, followed by a discussion involving the combining of these components and their use in a film structure.

Olefinic Polymer

Olefinic polymers of the present invention include olefic homopolymers, such as polypropylene, low density polyethylene ("LDPE"), linear low density polyethylene ("LLDPE"), ultra-low density polyethylene ("ULDPE") and the like.

"Olefinic polymer" as used herein is intended to also include copolymers and derivatives thereof. Such copolymers (or derivatives thereof) include polymers derived from a combination of olefinic monomer and vinyl ester monomer (or acid derivatives of the vinyl ester monomer). The most preferred vinyl ester monomers (or acids thereof) are those having one to seven carbon atoms, such as acetates, acrylates, methacrylates, (meth)acrylic acids (which can be partially or wholly neutralized with ions, such as zinc or sodium) and the like. Critical to the olefinic polymer of the present invention is that it be capable of being formed into a thin sheet or film, such as for a conventional packaging application. In an alternative embodiment, the olefinic polymer is heat sealable to itself.

Preferred olefinic polymers include polypropylene which is a well known polymer having a repeating formula of —CH(Me).CH$_2$—. Polypropylene homopolymer is generally derived from propane with the aid of an organometallic catalyst. It generally has a relatively low density (around 0.9 grams per milliliter) and has physical properties which make it an ideal packaging film material.

Polyalkylene Imines ("PAI")

The preferred polyalkylene imines of the present invention can be defined according to the following structure:

in which n and m are the same or different and have a numerical value of at least 1. A high percentage of nitrogen is preferred, and therefore preferably, n is 1 to 4, more preferably 1 (polyethylene imine or "PEI"), and m is a value of a few thousand or more. It is generally most advantageous to avoid use of very low molecular weight materials having excessive amounts of materials which can migrate. The most preferred molecular weight (determined by light scattering) is preferably above about 800 and more preferably above about 1500 and most preferably above about 2500.

PEI is synthesized from aziridine (or ethyleneimine) generally through sulfonic acid esterification of ethanolamine; the monomer is then reacted in an acid-catalyzed ring-opening homopolymerization to form the PEI molecule. In the most preferred embodiment, the PEI is not heavily branched and preferably has a relatively low percentage of tertiary amines.

Optional Additives

"Binding Agents" can be added to the compositions of the present invention to further "lock in" the PAI to the polymer matrix. Useful binding agents are functionalized polymers which will react with polyalkylene imine. Preferred binding agents are polymers functionalized with carboxyl functionality, most particularly anhydride functionality.

Other optional additives include antioxidants, lubricants, disspersants (or surfactants) in an amount of about 5 percent by weight or less. Conventionally known additives relating to film manufacturing or processing can optionally be used as part of the present invention.

Combining the Olefinic Polymer With the PAI

The present invention is also directed to a process for preparing a blend of olefinic polymer and PAI comprising the following steps:

(i) adding the PAI and olefinic polymer in a weight ratio of about 0.001-30:100 to a compounding extruder, Banbury mixer or the like; and (ii) blending the mixture at temperatures between about 85° C. and about 300° C. (more preferably 100° C.-225° C.), thereby forming a polymer blend.

The present invention also relates to a process for preparing films by a compounding or masterbatch process.

The method of producing the blend is not material as long as a relatively uniform distribution of the PAI polymer through the olefinic polymer is obtained. It is preferred for the blend to have intimate mixing of the polymers, i.e. microscopical distribution of PAI through the olefinic polymer, whereby the size of the dispersed phase is no more than 100 microns, preferably about 10 microns or less.

In one modification, the blend components are extruded, and the blend is obtained as the extrudate. In an alternate modification, the components are blended in other mixing devices which exhibit high shear, such as a Banbury or similar-type mixer.

The blend of PAI and olefinic polymer can be prepared by the following process:

the PAI is metered into an olefinic polymer influent stream into an extruder-type apparatus;

the combination of material is then moved into a feeder attached to a 15 mm co-rotating twin screw extruder (or the like), such as one made by Baker Perkins (a 30 mm twin screw extruder may also be used, such as a Werner and Pfleiderer extruder, and even larger equipment is contemplated as useful herein).

The feed rate can be set at different rates without affecting the resultant product. The mixture can be starve fed (less than the capacity of the screw) or flood fed (more than the capacity of the screw). The extruder can be run at a variety of speeds, such as 300 rpm for a 15 mm extruder. The resulting extruded strand is preferably quenched (such as in water or the like) at room temperature, then fed into a chopper to form pellets.

Pellets can then be used to make films in conventional thermoplastic film processing equipment. The extruder can be run at temperatures ranging from about 85° C. to about 300° C. A preferred temperature range can be 100° C. to 225° C. The processing conditions will have to be regulated such as by limiting residence of time of the contents of the mixing device in order to limit possible polymer degradation and achieve desired intimate mixing of the polymer.

An alternative method for preparing a blend involves a masterbatch process, whereby the olefinic polymer and the PAI are mixed together in high shear mixing equipment, such a Banbury mixer extruder or the like.

Whether the final mixture is made by extrusion or high shear mixing, the resulting material can then be used as a concentrate and fed into another olefinic polymer stream (either the same or different from the olefinic polymer initially mixed with the PAI to form the concentrate) and extruded as described above or mixed in a high shear mixer (as also described above) and ultimately extruded into a film, slabs, sheet or the like.

The final film, slab or sheet product preferably comprises a weight ratio of PAI to olefinic polymer in the range of about 0.001-30:100-300, more preferably about 0.001-20:150-250 and most preferably 0.01-10:200.

The Final Composition

The final film composition has been found to be extremely stable. Migration or surface blooming of the liquid PEI within the olefinic polymer has been surprisingly found to not be a problem in the practice of the present invention. By incorporating the PAI into an olefinic polymer, the PAI can be incorporated into an existing layer of a conventional multilayer packaging cost and overall complexity of the end product.

Furthermore, the PEI can be incorporated into a packaging material in very low concentrations with substantially uniform distribution Indeed, concentrations dramatically less than the PEI concentrations suggested in U.S. Ser. No. 724,431 are possible according to the present invention. Since less PEI is used according to the present invention, costs are generally lower, particularly in light of the simpler manufacturing process.

It was also somewhat surprising that the PEI was able to maintain its aldehyde scavanging properties, even when alloyed into an olefinic polymer. Although carboxyl groups tend to react with the PEI and so diminish the efficacy of the PEI, most olefinic polymers provide a useful matrix upon which PEI can be incorporated.

It has been surprisingly found that although the high viscocity of PEI would indicate difficulty in pumping and metering into a melt stream, a back pressure of only 20 or so pounds was able to transport an adequate amount of PEI (which could be acurately metered) into the melt stream to create the concentrate of the present invention.

In the preferred embodiment, a functional barrier is placed over the PAI/olefinic polymer film. The functional barrier is preferably permeable to aldehydes but substantially impermeable to PAIs. Generally, the functional barrier can be extremely thin, since the PAI is already locked into the olefinic polymer matrix, particularly where a binding agent is used as described above. Generally, the film can be as thin as possible without allowing for holes or non-uniform coverage. Functional barriers of three mils or greater are possible, although thicknesses of less than one mil are preferred. The preferred functional barrier layer is preferably an olefinic polymer as already described, most preferably a olefinic copolymer, derived from an olefin monomer, such as ethylene and one or more vinyl ester (or acid derivatives thereof) comonomers. Examples of useful functional barriers include ethylene vinyl acetate, ethylene (meth)acrylic acid (unneutralized or wholly or partially neutralized with ions, such as zinc or sodium) or blends of these or other olefinic polymers. In the preferred embodiment, the functional barrier is capable of heat sealing with itself. In an alternative embodiment, the composition contains a binding agent which would allow the composition to be used as the food contact and/or heat seal layer.

Examples

In a first experiment, PEI ("POLYMINIM Water-Free" available from BASF) was incorporated into polypropylene ("3868" from FINA Chemical Corp.) as a concentrate using a high shear mixer, and the concentrate was then blended into another polypropylene resin ("3365" also from FINA) using an extruder, and the resulting compound was extruded into films of about 0.7 to about 1.0 mils in thickness. The amount of concentrate added to the polypropylene feed was varied, so that different films were obtained containing different concentrations of PEI. The films were then placed in a hexanal environment and the amount of hexanal scavenged was determined. The results of the first experiment are tabulated below.

| Run | wt. % PEI in concentrate | wt % PEI in final film | % hexanal removed |
|---|---|---|---|
| 1 | 1.0 | .02 | 61.6 |
| 2 | 1.0 | .05 | 59.4 |
| 3 | 1.0 | .10 | 96.3 |
| 4 | 2.5 | .25 | 97.8 |
| 5 | 5.0 | .50 | 99.0 |
| 6 | 5.0 | 1.0 | 99.2 |

-continued

| Run | wt. % PEI in concentrate | wt % PEI in final film | % hexanal removed |
|---|---|---|---|
| Control | 0.0 | 0.0 | 11.4 |

In a second set of experiments, 3 layer coextrusions were made comprising: 1. a 1 mil of high density polyethylene (ALATHON F-7815) outer layer; 2. a 1 mil high density polyethylene (ALATHON F-7815) containing PEI middle layer; and 3. partially neutralized ethylene-acrylic acid copolymer ionomer (SURLYN 1652) functional barrier outer layer. Hexanal scavenging by the resulting films was then measured, and the results are provided below.

| Weight Percent PEI in Middle Layer | Weight Percent Hexanal Removed |
|---|---|
| 0 | 44.6 |
| .02 | 62.3 |
| .05 | 78.5 |
| .10 | 89.6 |
| .25 | 81.1 |
| .50 | 96.6 |
| 1.00 | 97.8 |

In both sets of experiment, "percent hexanal removed" was calculated as follows. The film was cut into 2 inch by 2 inch squares from each film sample. Each sample was then accordion-folded and put in an HS101 headspace vial. Before sealing with a septum closure, each sample was spiked with 2 microliters of methylene chloride solution containing 2000 ppm hexanal. After sealing, the samples were loaded into an HS101 automatic headspace GC unit. Each sample was thermostated at 60° C. for 30 minutes before making a single injection. The resultant hexanal peak was detected by a flame ionization detector and quantitated based upon prepared standards. The data was then integrated into a Waters Maxima data system, set up to calculate the amount of hexanal present in each sample vial. The results were then subtracted from 100%, thereby providing the weight percent of hexanal scalped.

What is claimed is:
1. A composition comprising:
   a) an olefinic homopolymer or copolymer capable of being extruded into a film or sheet and used in a packaging application; and
   b) a polyalkylene imine ("PAI") having the following structure:

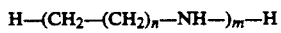

$$H-(CH_2-(CH_2)_n-NH-)_m-H$$

where m is at least 1 and n is in the range from 1 to about 4, and the molecular weight of the PAI (determined by light scattering) is greater than about 800, wherein the weight ratio of the PAI to olefinic polymer is in the range of about 0.001–30:100, and wherein the olefinic polymer is derived from:
   i) olefinic monomer; and
   ii) optionally, vinyl ester monomer, or an acid derivative of a vinyl ester monomer.
2. The composition of claim 1, wherein the olefinic polymer is derived for ethylene, propylene, or butylene.
3. The composition of claim 2, wherein the olefinic polymer is also derived from acetic acid, acrylic acid, methacrylic acid or ester derivatives thereof.

4. The composition of claim 2 further comprising a binding agent.

5. The composition of claim 3, wherein the binding agent is a polymer having carboxyl or anhydride functionality.

6. The composition of claim 2, wherein the PAI is polyethylene imine.

7. The composition of claim 2, wherein the PAI defines a substantially dispersed phase defining microscopic particles, and the olefinic polymer defines a substantially continuous phase.

8. The composition of claim 2, wherein said composition is a sheet or film.

9. A method of extending the shelf life of an oil containing food, said method comprising the steps of:
   packaging the food in a film comprising the composition of claim 2.

10. The package of claim 8 further comprising a second sheet or film, whereby said second sheet or film provides barrier properties.

11. The package of claim 10, wherein the second sheet or film is an olefinic polymer defining a thickness of about 3 mils or less.

* * * * *